Aug. 17, 1971   J. K. BULL   3,600,207

NON-SHRINK GROUT MIXTURE

Filed Feb. 14, 1969

John K. Bull,
Inventor by Lyle G. Trorey,
Agent

United States Patent Office 3,600,207
Patented Aug. 17, 1971

3,600,207
NON-SHRINK GROUT MIXTURE
John K. Bull, 1250 W. 32nd Ave., Vancouver,
British Columbia, Canada
Filed Feb. 14, 1969, Ser. No. 799,272
Int. Cl. C04b 7/32
U.S. Cl. 106—87                                    3 Claims

ABSTRACT OF THE DISCLOSURE

A hydraulic setting, acid resistant, non-shrink grout mixture, the essential components of which are calcium aluminate cement, cementitious calcium aluminate fine aggregate and aluminum powder.

BACKGROUND OF THE INVENTION

The present invention relates to hydraulic setting grout mixtures, and in particular to grout mixtures which are acid resistant and have non-shrink qualities.

Concretes employing calcium aluminate cement, such as Lafarge's Ciment Fondu and a cementitious calcium aluminate fine aggregate such as Lafarge's Alag, are well known and widely used. Such concretes, unlike portland cement based concretes which have a high proportion of free lime in the mix, have little or no free lime and, therefore, are highly resistant to acidic liquors. These concretes are also much stronger than the portland cement based concretes and as the components of the mixture combine with more water than the portland cement based mixtures, are, therefore, less porous than the latter. These properties have, consequently, made the use of calcium aluminate based concretes highly desirable in areas involving liquid storage or seep prevention, particularly where the liquids are of an acidic nature.

The high strength of calcium aluminate cement based concretes make them desirable when they are employed as grouts in those cases where a high strength mechanical bond is necessary and where high compressive stresses must be met.

Calcium aluminate cement based concretes, like all hydraulic setting concretes, have a relatively high shrinkage factor. When used as a grout to set anchor bolts, radial shrinkage results in a weakening of the expected mechanical bond and when used in other cases, such as in setting a base for machinery or for columns, the vertical shrinkage has undesirable effects.

OUTLINE OF THE INVENTION

The present invention provides a grout mixture employing calcium aluminate cement and calcium aluminate fine aggregate, which, consequently, gains the strength and acid resistant benefits of these two components in a grout mixture and yet which does not have the shrinkage factor common to hydraulic setting grouts thereby utilizing the high strength of this type of grout mixture in obtaining high mechanical bonds where it is used for placing anchor bolts and the like.

The present grout mixture, in order to obtain this end, employs a percentage of finely divided aluminum powder which does not detract from the strength and acid resistant characteristics of the conventional calcium aluminate cement based grout mixture and which provides a grout mixture having non-shrink qualities.

In the specification and claims hereinafter, the term non-shrink when applied to the grout mixture of the present invention shall be deemed to mean a grout mixture, the volume of which, when set, is substantially the same as, or a little greater than, its volume in its initial plastic state.

DESCRIPTION OF PREFERRED EMBODIMENT

In order to produce a calcium aluminate cement based grout mixture with non-shrink qualities, the inclusion of a material calculated to cause some expansion of the mixture during setting is obvious. Aluminum was chosen as an added constituent to the mixture in view of the tendency of aluminum to release hydrogen under attack by caustic solutions. The choice of aluminum was also made because of the resistance of aluminum to acid attack.

In order to determine the effect of aluminum powder on a calcium aluminate cement based grout mixture a number of cement, water and aluminum powder mixes were tried at varied temperatures, varied portions and varied particle sizes of aluminum powder. It was noted that the best results obtained were in those mixes in which the aluminum powder constituted between 0.02 and 0.03 percent of the total weight of the cement.

In one of the tests, granular aluminum powder was separated, by sieving, into the following particle distribution sizes:

(a) 44 to 74 microns (200–325 mesh)
(b) 149 to 595 microns (30–100 mesh)
(c) 595 to 841 microns (20–30 mesh)

Each fractional size was thoroughly blended, in the amount of 0.022 percent by weight, with calcium aluminate cement, particularly Lafarge's "Ciment Fondu." Twenty-five percent by weight of water was then added to the mix, which was then thoroughly mixed and placed in containers.

Figure 1:
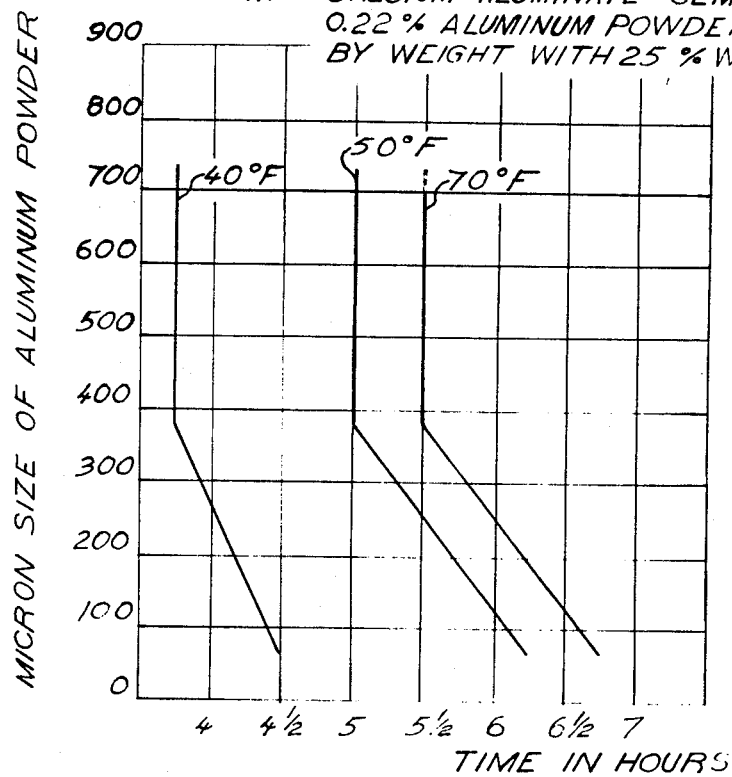
FIG. 1 is a graphical comparison of the setting times of various mixtures of calcium aluminate cement and aluminum powder of various sizes at various temperatures.

The setting (hardening) time was then determined in accordance with ASTM C191 specification requirements for each mixture, at temperatures of 40° F., 55° F. and 70° F. (these temperatures being in the normal working temperature range). The results of the test are shown in graphical form in FIG. 1 and in tabular form as follows:

| Particle size in microns | Temp., °F. | Setting time |
| --- | --- | --- |
| 595–841 | 40 | 4 hours 15 minutes. |
| 149–595 | 40 | Do. |
| 44–74 | 40 | 4 hours 30 minutes. |
| 595–841 | 55 | 5 hours 0 minutes. |
| 149–595 | 55 | Do. |
| 44–74 | 55 | 6 hours 15 minutes. |
| 595–841 | 70 | 5 hours 30 minutes. |
| 149–595 | 70 | Do. |
| 44–74 | 70 | 6 hours 45 minutes. |

It was observed that the variation of the size distribution of aluminum powder from 149 to 841 microns at constant temperature, had no variable effect on the setting characteristics of the cement. However, in various mixtures containing aluminum powder having a particle size between 44 and 74 microns the setting time was delayed 15 minutes at 40° F. and by one hour and 15 minutes at temperatures from 55° F. to 70° F.

No visible vertical expansion in the unconfined state occurred with the use of 595 to 841 microns size aluminum powder in the mixture. In those mixtures containing aluminum having a particle size of 149 to 595 microns, expansion was slight but non-uniform. Mixtures containing powder in which the particle size was between 44 and 74 microns expanded uniformly and visibly. Expansion commenced approximately four hours after the mixing of the constituents and continued until set had taken place.

To determine the effect of granulated aluminum powder in a grout mixture, a number of mixtures were prepared containing equal quantities of calcium aluminate cement, cementitious calcium aluminate fine aggregate, and, a high silica sand aggregate, together with 0.03 percent by weight of the cement of finely ground aluminum metal powder having a particle size in the range 44 to 74 microns.

Three of the trial mixes and the results thereof are as follows:

Trial Mix No. 1

Calcium aluminate cement was thoroughly blended with 0.03 percent by weight of finely ground aluminum metallic powder having a particle size in the range 44 to 74 microns. Equal quantities by weight of this cement and aluminum powder mixture, calcium aluminate fine aggregate and a high silica sand were blended. Water, to produce a water cement ratio by weight of 0.45 was then added. It was soon noted that the mixture produced a consistency which was too wet to be controlled under practical conditions. Considerable bleeding occurred, which resulted in a soft-surface condition following hardening.

Two inch by two inch cubes cast in this mix were then tested at 22 hours and showed an average compressed strength of 7,850 lbs. per sq. in.

Trial Mix No. 2

The weight proportions of Trial Mix No. 1 were repeated. The water content, however, was adjusted to produce a water-cement ratio of 0.40 by weight. Visual observation showed this mix to be very workable with sufficient flowability to be contained under practical conditions. Positive vertical expansion of 0.84 percent in the unconfined grout was measured. This grout hardened at a four hour period at which no further expansion took place.

Two inch by two inch cubes cast from Trial Mix No. 2 showed an average 22 hour compressive strength of 9,000 lbs. per sq. in.

Trial Mix No. 3

To offset prior bleeding characteristics of Trial Mixes Nos. 1 and 2, a mix was made up having the following components, the proportions being expressed by weight.

Calcium aluminate cement—1 part
Granulated aluminum powder—0.22 percent by weight of cement
Calcium aluminate fine aggregate—1 part
High silica sand—0.9 part
Pozzolan—0.1 part Sufficient water was added to produce a water-cement ratio of 0.40 by weight. It was noted that no bleeding occurred with Trial Mix No. 3. Workability and flowability were ideal. The setting time of Trial Mix No. 3 was measured at four hours and thirty minutes, at which time the grout mixture began to generate measurable heat. Unconfined vertical expansion was shown to be 1.24 percent at time of set. Trial Mix No. 3 which included Pozzolan, to prevent "bleeding," which delayed the setting time of Trial Mix No. 3 to four hours and thirty minutes, showed a greater expansion than Trial Mix No. 2 in which Pozzolan was not present.

Figure 2:
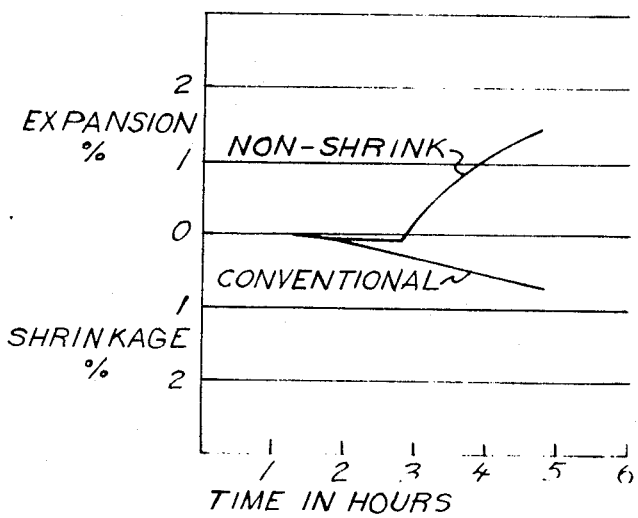
FIG. 2 is a graphical comparison of the volumetric changes of a non-shrink mixture containing aluminum powder and a grout mixture having no aluminum powder between initial pour and set.

The shrinkage characteristics of a non-shrink grout prepared in accordance with Trial Mix No. 3 and a conventional grout omitting the aluminum powder are graphically illustrated in FIG. 2 of the drawings. As illustrated, the conventional grout shrinks continuously from the time of pour to the time of set. However, the non-shrink grout of the invention shrinks slightly during the initial 2 hours and 30 minutes and then expands roughly 1.24 percent until set occurs.

In the foregoing tests, it was concluded that a trial mix prepared in accordance with Trial Mix No. 3 in which the granulated aluminum powder having a particle size range between 44 to 74 microns and in the proportion of between 0.02 and 0.03 percent (preferably 0.02 percent) by weight of calcium aluminate cement provided the desired expansion characteristics. This mixture expanded only 1.24 percent without noticeable loss of strength and proved to be highly workable.

It is also to be noted that although, as described, the preferred mix included a high silica sand, any suitable fine aggregate having a low calcium content may be employed such as carborundum to provide a grout mixture having desired acid resistant and non-shrink qualities (as well as abrasive resistant characteristics).

While the invention has been described above with reference to preferred and particular embodiments thereof, it is to be understood that various alternatives will become apparent to the skilled artisan from the reading of the foregoing description and that such alternatives will fall within the scope of the present invention.

I claim:

1. A hydraulic setting non-shrink groute mixture consisting essentially of:

Calcium aluminate cement—1 part
Granulated aluminum powder—0.02 to 0.03 percent by weight of the cement
Cementitious calcium aluminate fine aggregate—1 part
Low calcium fine aggregate—1 part 2. A grout mixture as claimed in claim 1 in which the particle size of the aluminum powder is in the range forty-four to seventy-four microns.

3. A grout mixture as claimed in claim 1 in which the low calcium fine aggregate is high silica sand.

References Cited

UNITED STATES PATENTS

| | | | |
|---|---|---|---|
| 3,442,672 | 5/1969 | Kampf | 106—87 |
| 2,235,008 | 3/1941 | Brownmiller | 106—104 |
| 2,198,601 | 4/1940 | Brownmiller | 106—87 |

FOREIGN PATENTS

| | | | |
|---|---|---|---|
| 268,893 | 4/1927 | Great Britain | 106—87 |

TOBIAS E. LEVOW, Primary Examiner

W. T. SCOTT, Assistant Examiner

U.S. Cl. X.R.

106—104